Dec. 23, 1930.  C. D. PETERSON  1,786,408
TRANSMISSION DAMPENER
Filed Feb. 24, 1930
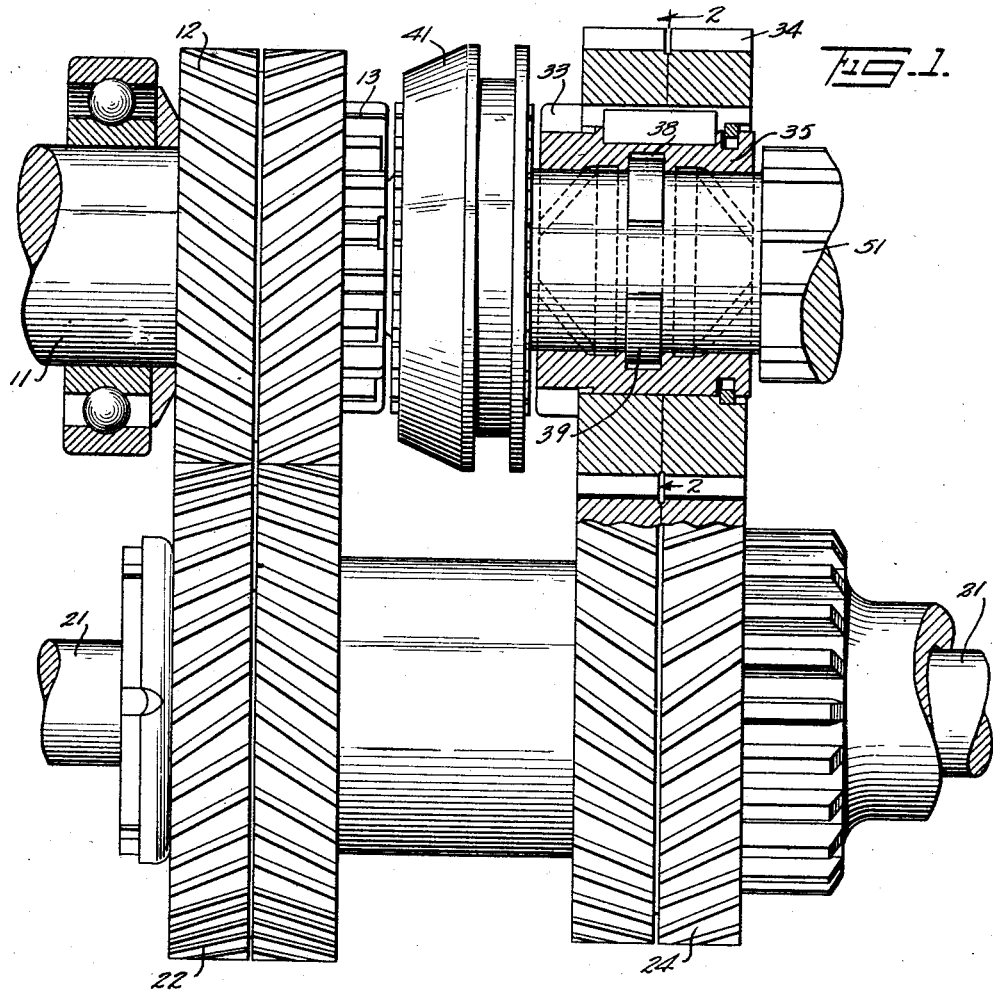
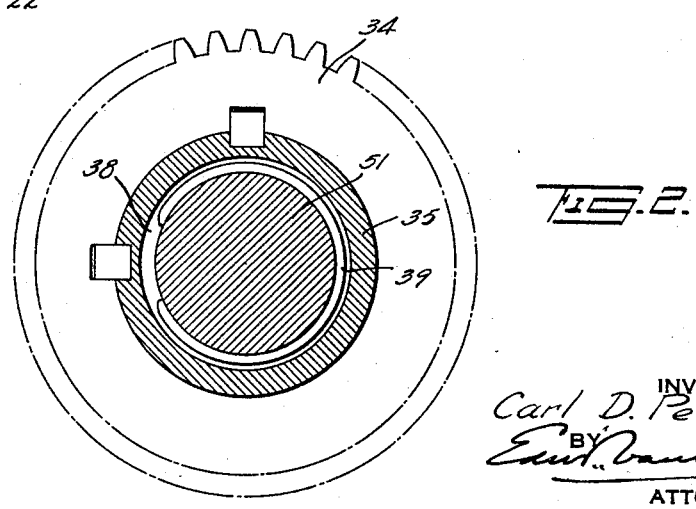
INVENTOR
Carl D. Peterson
BY
ATTORNEY Patented Dec. 23, 1930

1,786,408

UNITED STATES PATENT OFFICE

CARL DAVID PETERSON, OF SYRACUSE, NEW YORK, ASSIGNOR TO BROWN LIPE GEAR COMPANY, A CORPORATION OF NEW YORK

TRANSMISSION DAMPENER

Application filed February 24, 1930. Serial No. 430,843.

My invention relates to dampeners for transmissions more particularly transmissions in which the gear trains are of the herring-bone type and run in constant mesh, and has for its object the removal of noises common to this type of transmissions.

In the development of the herring-bone gear type transmissions, especially for automobiles, I have noticed that there is a flutter of the herring-bone gears which sets up an objectionable noise at certain engine and corresponding vehicle speeds.

I have discovered that this flutter is mainly caused by the torsional vibration of the engine shaft as the flutter is pronounced at the same speed on all cars of the same characteristics.

I have found out that this flutter and the noise produced thereby can be eliminated by the dampening of the otherwise free endwise sliding movement of the main shaft herring-bone gear. This dampening puts a drag on the main shaft floating herring-bone gear and dampens out the endwise movement so that there will be no flutter and consequently will eliminate the noise caused thereby.

The drag pressure which I propose will be less than the lateral tooth pressure of the mating herring-bone gears, hence the self-centering feature is not disturbed.

The foregoing and other features of my invention will now be described in connection with the accompanying drawing forming part of this specification in which I have represented my transmission dampener in its preferred form after which I shall point out more particularly in the claims those features which I believe to be new and of my own invention.

In the drawings:

Figure 1 is a side view in part section of part of a standard transmission of the herring-bone type in which I have embodied my invention.

Figure 2 is a transverse section of the main shaft free herring-bone gear, line 2—2, Figure 1.

As illustrated in Figure 1, I have shown a part of a standard herring-bone transmission of the herring-bone type. The main drive shaft 11 is provided with herring-bone gears 12 and clutch engaging means 13. Counter shaft 21 has its meshing gears 22 which mesh with gears 12 and gears 24 which mesh with gears 34. The gears 22 and 24 are fastened to the counter shaft, while gear 34 is mounted on a carrier 35 which is provided with clutch engaging means 33. The clutch collar 41 is adapted to engage either the clutch engaging means 13 or 33. As this is common to all transmissions of the type it is thought that no further detailed description is necessary.

My invention is the production of the means to prevent a flutter of the gear 34. In the carrier 35 which is adapted to slide and rotate on the driven shaft 51 I provide an annular groove 38 in which I insert a spring ring 39 adapted to snugly fit the groove and bring pressure on the main shaft 51. By virtue of the drag of the spring ring 39 on the main shaft 51 and the close fit of the ring 39 in the annular groove 38 in the carrier 35 the endwise movement of the gear 34 is dampened which prevents the flutter and corresponding noises coincident thereto, and still not affect the self-centering feature of the main shaft third speed gears of a four speed transmission or the second speed gears of a three speed transmission.

I wish it distinctly understood that my transmission dampener herein illustrated and described is in the form in which I desire to construct it but that changes or variations may be made as may be convenient or desirable without departing from the salient features of my invention and I therefore intend the following claims to cover such modifications as naturally fall within the lines of invention.

I claim:

1. A herring-bone gear provided with a bore slidable and rotatable upon a shaft, the gear provided with an annular slot cut in its bore, a spring ring within the bore gripping the shaft.

2. A herring-bone gear and a shaft on which the gear is mounted, a carrier interposed between the gear and shaft and slidable on the shaft, means within the carrier to frictionally engage the shaft.

In testimony whereof I affix my signature.

CARL DAVID PETERSON.